No. 764,357. PATENTED JULY 5, 1904.
J. G. HEASLET.
BRAKE MECHANISM.
APPLICATION FILED NOV. 14, 1903.
NO MODEL.
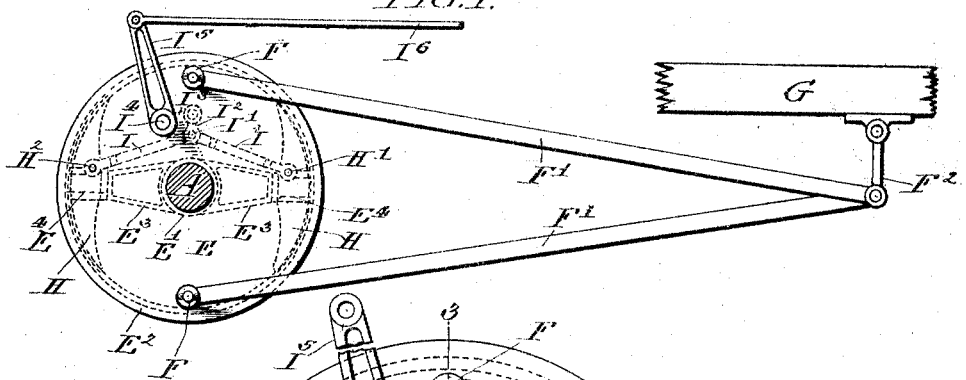
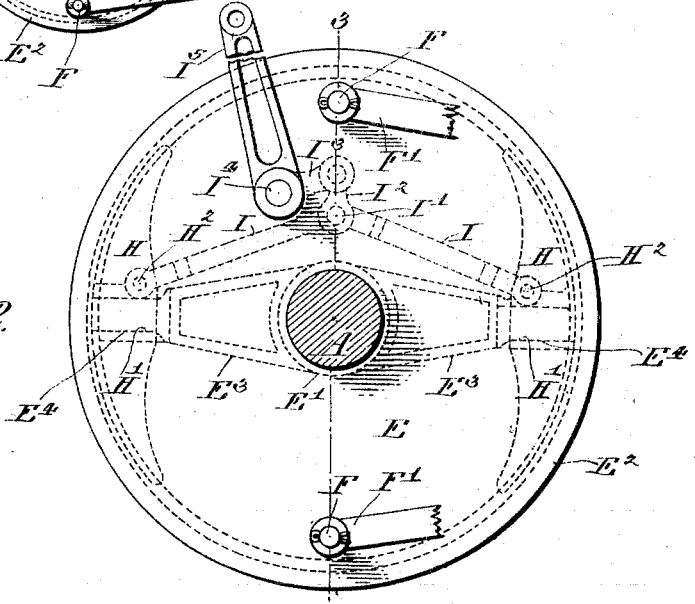
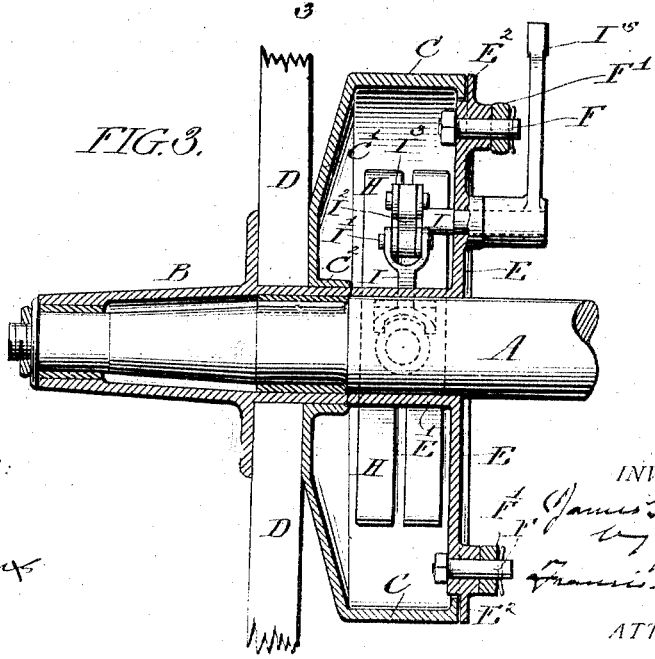
WITNESSES:
INVENTOR.
James G. Heaslet
by
Francis J. Chambers
ATTORNEY.

No. 764,357.                                                                                             Patented July 5, 1904.

UNITED STATES PATENT OFFICE.

JAMES G. HEASLET, OF PHILADELPHIA, PENNSYLVANIA, ASSIGNOR TO HIMSELF AND HARRY M. HART, OF PHILADELPHIA, PENNSYLVANIA.

BRAKE MECHANISM.

SPECIFICATION forming part of Letters Patent No. 764,357, dated July 5, 1904.

Application filed November 14, 1903. Serial No. 181,122. (No model.)

*To all whom it may concern:*

Be it known that I, JAMES G. HEASLET, a citizen of the United States of America, residing in the city and county of Philadelphia, in the State of Pennsylvania, have invented a certain new and useful Improvement in Brake Mechanism, of which the following is a true and exact description, reference being had to the accompanying drawings, which form a part thereof.

My invention relates to brake mechanism especially intended and adapted for use in connection with automobiles, though applicable as well to other uses where braking devices are required.

The object of my invention is to provide a braking device of great simplicity, strength, and efficiency, and the nature of my improvements will be best understood as described in connection with the drawings in which my invention is illustrated, and in which—

Figure 1 is a side elevation of the brake mechanism; Fig. 2, a similar view, on an enlarged scale, with some parts of the mechanism shown in Fig. 1 omitted; and Fig. 3, a cross-sectional view on the line 3 3 of Fig. 2.

A indicates the axle, to which are secured the hub B and wheel D.

C is the brake-drum, which is secured to the hub and axle through the web $C'$ and flange $C^2$, the drum rotating with the wheel and axle.

E is a relatively fixed plate which, as shown, is journaled on the axle A through its connected sleeve $E'$ and is formed with a flange $E^2$ lapping the edge of the brake-drum, so as to practically inclose the space in which the brake-shoes are situated. The plate E is prevented from turning in the construction shown in Fig. 1 by being secured, through bolts F F, to rods $F'$ $F'$, the other ends of which are connected to a post $F^2$, secured to the frame G. On the inner side of the plate E are the braces or flanges $E^3$ $E^3$, which support the radially-extending bearing-pins, (indicated at $E^4$ $E^4$,) and on these bearings are secured the brake-shoes H H, which are formed with recesses $H'$, which fit over the bearings $E^4$, permitting the brake-shoes to slide in and out on the bearings. Each of the brake-shoes has secured to it a pin or stud, (indicated at $H^2$,) and to which is pivotally secured one of the actuating-links I I, said links I being coupled at their other ends to a pivot-pin $I'$, secured on a link $I^2$, which in turn is secured to the lever-arm $I^3$, extending out from the rock-shaft $I^4$, which rock-shaft is secured in a bearing formed in the plate E and has attached to its outer end the lever $I^5$, to which motion is communicated through a rod $I^6$. It will readily be seen that a movement of the lever $I^5$ toward the right will through the connections described force the brake-shoes H H into contact with the inner surface of the drum C, while an opposite movement of the lever $I^5$ will have the effect of withdrawing the brake-shoes from contact with the drum.

The device is powerful, simple, and efficient and so simple that further description is unnecessary.

Having now described my invention, what I claim as new, and desire to secure by Letters Patent, is—

A brake mechanism comprising a brake-drum turning with the part to be controlled by the brake, in combination with a relatively stationary plate E, bearings $E^4$, $E^4$, supported by said plate, brake-shoes H, H, supported on said bearings and movable in and out thereon, links I, I, for actuating the brake-shoes and means, including a rock-shaft supported on plate E, for actuating the links and brake-shoes.

JAMES G. HEASLET.

Witnesses:
  GEO. G. WHITCOMB,
  HART O. BERG.